2 Sheets--Sheet 2.
J. R. KNIGHT & J. P. COBURN.
Bed-Urinals for Medical Purposes.
No. 137,214. Patented March 25, 1873.
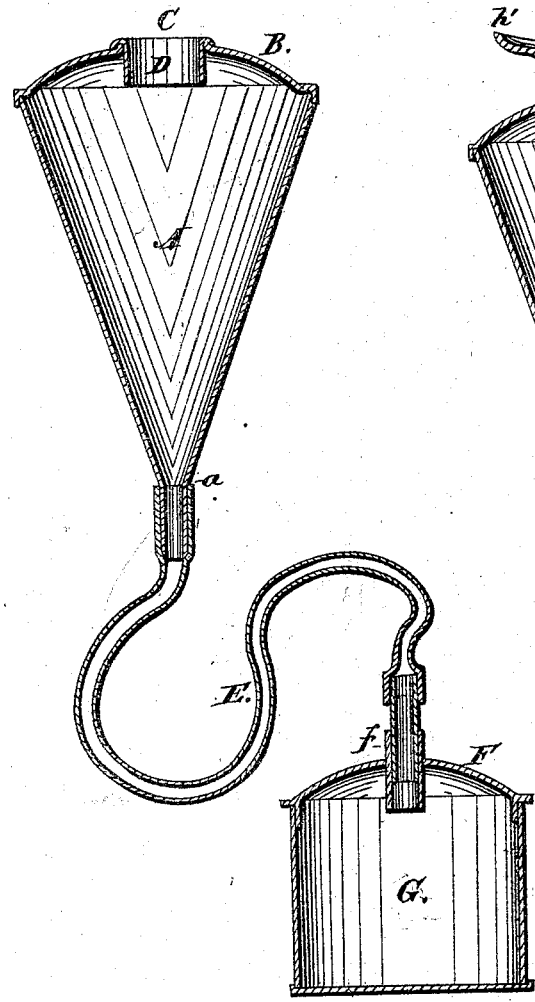
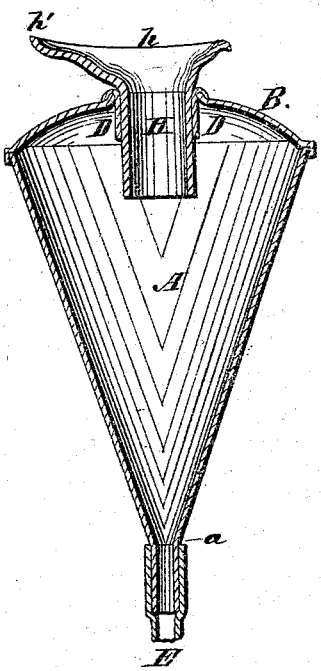
WITNESSES.
INVENTORS.

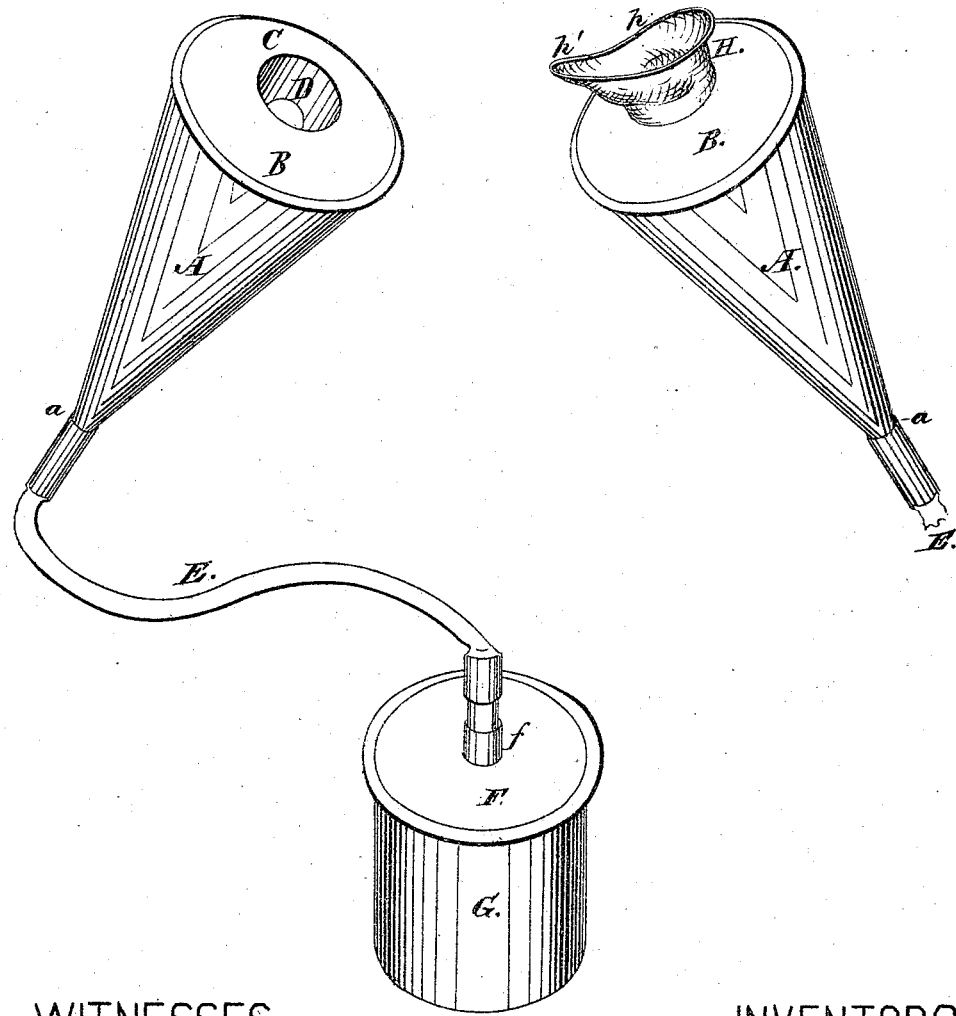

UNITED STATES PATENT OFFICE.

JONATHAN R. KNIGHT AND JOSEPH P. COBURN, OF GREENFIELD, MASS.

IMPROVEMENT IN BED-URINALS FOR MEDICAL PURPOSES.

Specification forming part of Letters Patent No. 137,214, dated March 25, 1873.

*To all whom it may concern:*

Be it known that we, JONATHAN R. KNIGHT and JOSEPH P. COBURN, of Greenfield, in the county of Franklin and in the State of Massachusetts, have invented certain new and useful Improvements in Bed-Urinals; and do hereby declare that the following is a full, clear, and exact description thereof, reference being had to the accompanying drawing making a part of this specification, in which—

Figure 1 is a perspective view of our device as arranged for use by a male. Fig. 2 is a like view of the same as arranged for female use; and Figs. 3 and 4 are, respectively, central longitudinal sections of Figs. 1 and 2.

Letters of like name and kind refer to like parts in each of the figures.

In many of the forms of sickness it is dangerous, if not impossible, for the patients to leave their beds or to sit up in bed, even for the purpose of evacuating the contents of the bladder, in consequence of which state of affairs they often render their persons or beds offensive to themselves and their attendants. To remedy this difficulty and enable the calls of nature to be met in an easy and cleanly manner is the design of our invention, which consists principally in the peculiar construction of the reservoir, substantially as and for the purpose hereinafter specified. It consists, further, in the construction of the attachment for females and its combination with said reservoir, substantially as and for the purpose hereinafter shown.

In the annexed drawing, A represents a vessel constructed of sheet metal in the form of a hollow cone, and inclosed at its larger end by means of a cover, B, which cover is, preferably, soldered or otherwise permanently secured at its edge to or upon the contiguous portion of said vessel. At the center of the cover B is provided a round opening, C, within which is secured a metal pipe, D, that corresponds in size and shape to the like features of said opening, and extends downward into the vessel A about two inches. The small end of the vessel A is open and provided with a short pipe, *a*, upon which is placed one end of a rubber or other flexible pipe, E, that has a sufficient length to reach from a person, when lying in bed, to a vessel placed beneath said bed, and at its lower end is attached to or upon a short pipe, *f*, which is secured within and extends upward from the cover F of a vessel, G.

As thus constructed, the device is ready for use by a male patient, the reservoir A being placed within the bed in a convenient position to enable it to receive the contents of the bladder, which is evacuated into its interior through the opening C, during which operation all outward passage of the fluid through said opening is prevented by the pipe D. After use, the reservoir is raised and its contents permitted to pass into the vessel G.

For use by females, a short pipe, H, is inserted within the opening C, and its upper projecting end *h* elongated laterally, made flaring, and provided with a projecting lip, *h'*, upon its lower side.

The apparatus thus described is cleanly, efficient, easily used, and can be furnished at a comparatively small expense.

Having thus fully set forth the nature and merits of our invention, what we claim as new is—

1. The reservoir A, provided with the cover B, the opening C, and the pipes D and *a*, and connected with a suitable vessel by means of a flexible pipe, E, substantially as and for the purpose specified.

2. In combination with the reservoir A, constructed as described, the pipe H provided with the flaring mouth *h* and lip *h'*, substantially as and for the purpose shown.

JONATHAN R. KNIGHT.
    JOSEPH P. COBURN.

Witnesses:
 JONATHAN COBURN,
 PUTM. FIELD.